(12) United States Patent
Gopalpur et al.

(10) Patent No.: US 7,774,238 B2
(45) Date of Patent: Aug. 10, 2010

(54) ONLINE MARKETPLACE MANAGEMENT SYSTEM WITH AUTOMATED PRICING TOOL

(75) Inventors: ChandraKanth C. Gopalpur, Portland, OR (US); Clark C. Hale, Portland, OR (US)

(73) Assignee: Monsoon, Inc., Portland, OR (US)

( * ) Notice: Subject to any disclaimer, the term of this patent is extended or adjusted under 35 U.S.C. 154(b) by 632 days.

(21) Appl. No.: 11/482,548

(22) Filed: Jul. 7, 2006

(65) Prior Publication Data

US 2008/0004981 A1 Jan. 3, 2008

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

2003/0191725 A1* 10/2003 Ratliff et al. ................ 705/400
2005/0256778 A1* 11/2005 Boyd et al. .................... 705/26
2008/0201273 A1* 8/2008 Davis et al. ................. 705/400

* cited by examiner

*Primary Examiner*—Mila Airapetian
(74) *Attorney, Agent, or Firm*—Wilson Sonsini Goodrich & Rosati

(57) ABSTRACT

An online marketplace management system includes software for managing sales by a user on one or more online marketplaces that are operated by entities other than the user. Online marketplaces are online e-commerce sales (e.g., retail) outlets that act as aggregators where third-party sellers (e.g., retailers) can sell items through branded web portals of the online marketplaces for a fee or a percentage of the sales prices. The software of the online marketplace management system includes an inventory management tool for managing inventory that is offered for sale on the one or more online marketplaces, and a pricing tool that provides automatic pricing of inventory that is offered for sale on the one or more online marketplaces, the automatic pricing being based upon real-time pricing of like inventory available on at least one online marketplace from one or more third parties other than the user.

7 Claims, 4 Drawing Sheets

ONLINE MARKETPLACE MANAGEMENT SYSTEM WITH AUTOMATED PRICING TOOL

FIELD OF THE INVENTION

The present invention relates to the management of inventory and sales of goods and services and, in particular, to a system that manages inventory and sales through online marketplaces and includes automated pricing based real-time pricing of other sellers within an online marketplace.

BACKGROUND AND SUMMARY OF THE INVENTION

Online marketplaces are defined herein as online e-commerce sales (e.g., retail) outlets that act as aggregators where third-party sellers (e.g., retailers) can sell items through branded web portals of the online marketplaces for a fee or a percentage of the sales prices. Generally, an online marketplace manages the customer data, the order process, and the payment transaction process before an order is sent to the third-party seller for fulfillment. Generally an online marketplace is a fixed-price sales channel such as Amazon.com, eBay Stores, Half.com, ABE, Alibris, etc., and generally is not an auction format.

Online marketplaces are typically adapted to accommodate either very small-scale sellers who can manually enter and track very small numbers of items, or very large-scale sellers who form partnerships with selected online marketplaces and build custom computer systems that integrate with those of the online marketplace. Many, many sellers list and sell too many items on online marketplaces to efficiently handle the cumbersome manual entry, tracking, and processing of orders, but list and sell far too few items to afford custom computer integration with the online marketplace. For these many online marketplace sellers, the efficiency or reaching large numbers of customers online is offset by the inefficiency of managing inventory, sales and pricing through the manual user interfaces of online marketplaces.

Moreover, the dynamic nature of pricing is this environment can become very difficult to manage for more than just a few items. Price changes by different sellers in an online marketplace can quickly render a listed price too high to effect any sale at all or so low that the profitability of the sale is less than optimal. Manual tracking of prices listed by different sellers, and updating of one's own prices can be time-consuming for small numbers of listed items and virtually impossible with even a moderate number of listed items.

Accordingly, the present invention provides an online marketplace management system that automates management of inventory, sales, and pricing for a seller in an online marketplace. The present invention includes software and methods that in operation provide a system for managing the sale of, for example, merchandise, through online marketplaces such as Amazon.com, eBay Stores, Half.com, ABE, Alibris, etc. The online marketplace management system allows users to sell large numbers of items (e.g., tens of thousands or even hundreds of thousands) through multiple marketplaces simultaneously from a single database.

In one implementation, the online marketplace management system incorporates inventory management tools, which include data-entry tools that can utilize a bar-code scanner, keyboard strokes or file import, automated warehousing and fulfillment tools, including automated location code assignment and processing by sort order, stock-level management tools, and automated inventory upload/download to online marketplaces.

The online marketplace management system also incorporates automated pricing tools, which may include pricing based on competitive market placement (cheapest price, average price of first five cheapest items, average price in class, etc.), regular and automated price updates for all inventory, allowing sellers to maintain competitive pricing automatically, cost of goods and profit indices, allowing sellers to protect margins, and monopoly pricing, allowing sellers to compare pricing between various marketplaces and set prices to highest marketplace price for a set period of time.

The online marketplace management system can further incorporate automated order management tools, including automated order downloads from all marketplaces, automated bulk printing of order packing slips, sortable according to pick patterns, automated email confirmations of orders shipped, automated order status tracking (New, Printed, Shipped), automated batch order cancellation and refund processing, and order lookup and management tools;

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
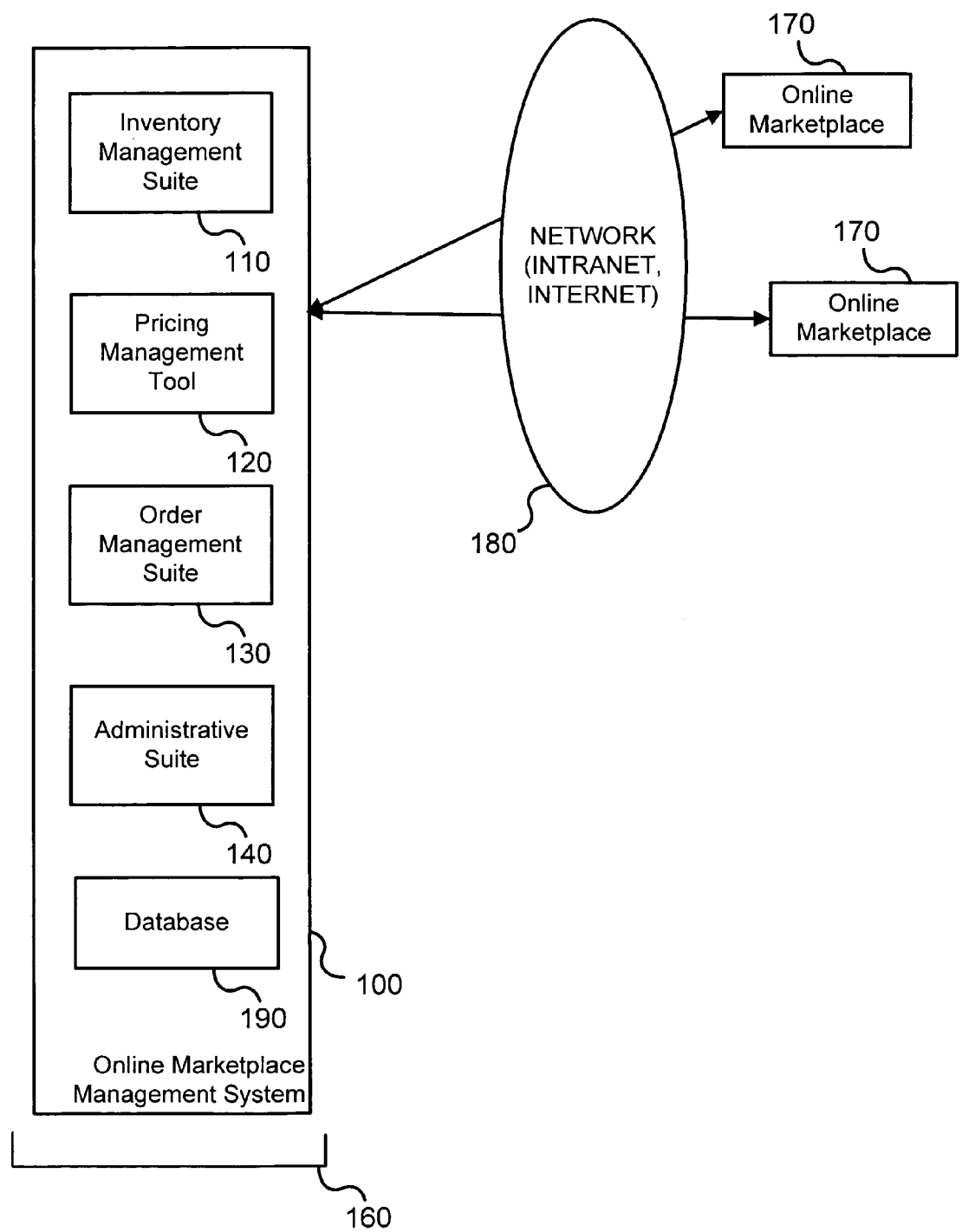
FIG. 1 is a block diagram of an online marketplace management system according to the present invention.

FIG. 1 is a block diagram of an online marketplace management system 100, which is implemented as software components that are stored on a computer-readable medium. Online marketplace management system 100 provides automated inventory control, automated price management, and enhanced order processing efficiency for sellers who sell on one or more online marketplaces. For example, the sellers may be small or mid-sized businesses and may have retail sales floors, or may operate as virtual fulfillment warehouses, or may do both.

As described below in greater detail, one implementation of online marketplace management system 100 includes an inventory management suite 110, a pricing management tool 120, an order management suite 130, and an administrative suite 140 that operate on a computer system 150 of an online marketplace seller 160. Online marketplace management system 100 communicates with one or more online marketplaces 170 (two shown) over a computer network 180 such as the Internet.

Online marketplaces 170 are defined herein as online e-commerce sales (e.g., retail) outlets that act as aggregators where third-party sellers (e.g., retailers) can sell items through branded web portals of the online marketplaces 170 for a fee or a percentage of the sales prices. Generally, an online marketplace 170 manages the customer data, the order process, and the payment transaction process before an order is sent to the third-party seller for fulfillment. Online marketplace seller 160 with online marketplace management system 100 of the present invention would be one such third-party seller.

Generally an online marketplace is a fixed-price sales channel such as Amazon.com, eBay Stores, Half.com, ABE, Alibris, etc., and is not an auction format. It will be appreciated, however, that an auction site that offers items at a selected price may operate as an online marketplace with respect to such items. Online marketplaces are sometimes referred to herein as "Marketplaces." Online marketplaces do not include comparison shopping sites such as Bizrate or Froogle, that merely pass the customer on to a third-party website for order processing, customer setup and payment processing.

Figure 2:
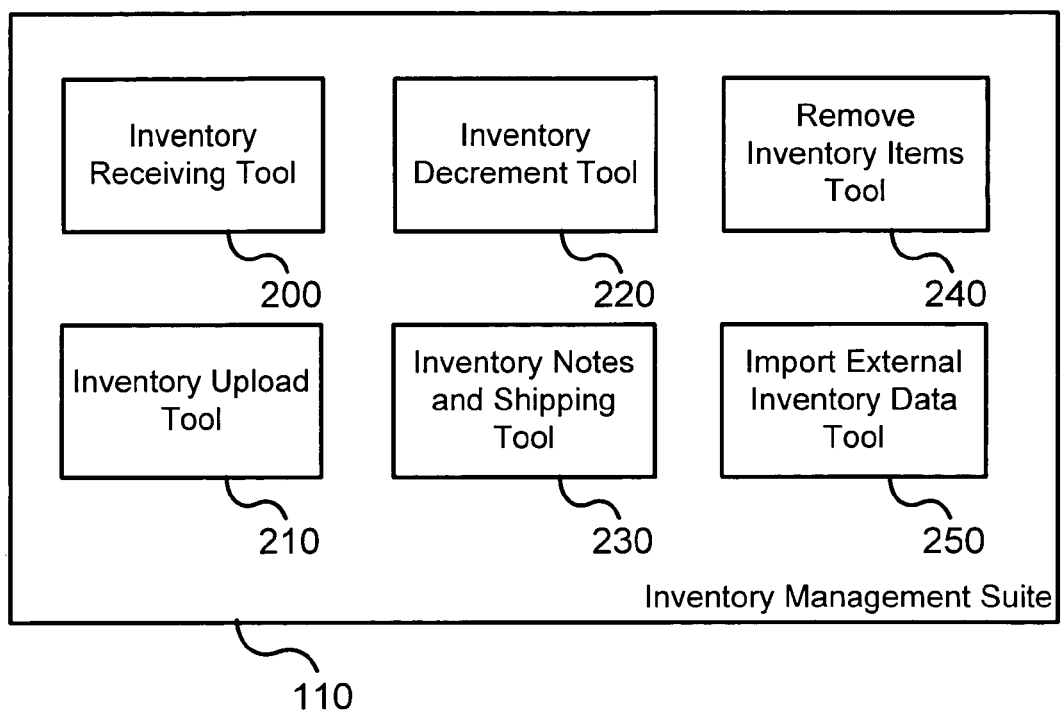
FIG. 2 is a functional block diagram of an inventory management suite in the online marketplace management system.

With reference to the functional block diagram of FIG. 2, inventory management suite 110 includes a variety of inventory management tools that allow online marketplace seller 160 to manage its stock of inventory, such as by easily and accurately scanning inventory into stock, and to maintain integrity of an inventory database 190 (FIG. 1).

An inventory receiving tool 200 allows online marketplace seller 160 to easily scan inventory items by product barcodes (e.g., UPC/ISBN) while retrieving and maintaining inventory records in database 180. In one implementation, 500 products or more can be scanned and entered each day for each worker online marketplace seller 160. Inventory receiving tool 200 allows online marketplace seller 160 to set various attributes about inventory as it is received or made available for sale. For example, the attributes may be set as defaults that can remain set until changed manually to ease the entry of inventory.

Table 1 lists an exemplary set of inventory attributes applicable to inventory relating to media content, such as books, music, etc. These attributes are included in inventory records that are maintained in database 180. It will be appreciated that other attributes could be set for any other types of products in accordance with the present invention, and that subsets of the attributes in Table 1 could alternatively be used.

TABLE 1

| | |
|---|---|
| Media | Format |
| Category | Vendor |
| Class | Condition |
| UPC/ISBN/ASIN | Price |
| List Price (MSRP) | Quantity |
| Notes | Shipping Options |
| Item Title | Author (books only) |
| Artist (music only) | Actor/Actress (movies only) |
| Director (movies only) | Manufacturer |
| Release Date | Warehouse Location Code (if desired) |

In this example, the attribute "media" indicates that the goods relate to media content, the "format" attribute indicates media format such as CD, books, electronics, etc., the "category" attribute may be defined by online marketplace seller 160 and may include a range of characterizations such as genre (e.g., Drama, Horror, etc.) or a special sale (e.g., Blowout Bin) or some other seller-defined characterization, the "vendor" attribute indicates the vendor or source from which the goods were obtained, the "class" attribute may indicate how new the goods are (e.g., Used, New, Refurbished, etc.), the "condition" attribute may indicate the condition of the goods (e.g., Like New, Very Good, Acceptable, etc.).

In addition, the UPC/ISBN/ASIN attribute may indicate a product barcode for the goods, the price attribute may indicate the price at which the online marketplace seller 160 is offering the goods, the list price (msrp) attribute may list a suggested retail price for the goods, the quantity attribute may indicate the quantity of the good in stock for the seller 160, the notes attribute may include any additional comments or information about the goods, the shipping options attribute may list any limitations or special shipping options available for the goods, the item title attribute lists the title or name of the goods, and other listed attributes are self-explanatory and may be specific to only certain media formats, as indicated.

Figure 3:
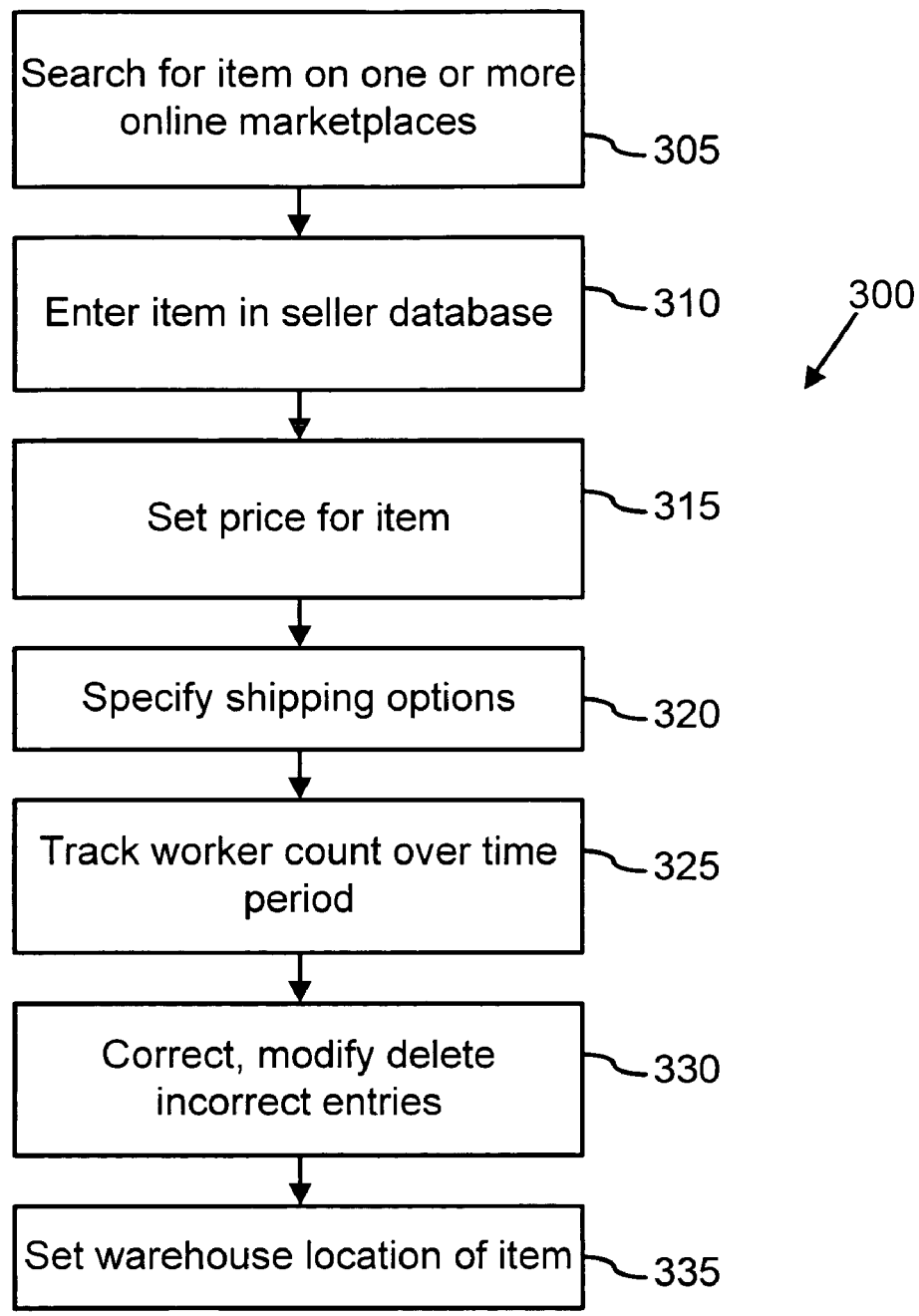
FIG. 3 is a flow diagram of an inventory intake method performed by an inventory receiving tool.

FIG. 3 is a flow diagram of an inventory intake method 300 performed by inventory receiving tool 110 for each item scanned or otherwise entered as being received or available to seller 160.

In step 305, the one or more online marketplaces where the item is to be listed are searched for the item product code to determine whether the item is already listed. For example, the search may be based upon the UPC/ISBN for the item determined from a scan of its barcode or by an ASIN number or by keywords (e.g., artist, title, manufacturer, etc.) entered by a worker for the seller. In one implementation, the barcode of only one of a number of identical items need be scanned because the information is otherwise the same for the items.

In step 310, the item is entered into seller database 180. The entry may be a new entry if there was not one previously, or a new quantity may be added to an existing database entry, with as many attributes specified as desired by the seller (e.g., Title, Artist/Author, Manufacturer, Notes, etc.).

In step 315, a price is set for the item in database 180. The price may be set manually or may be set automatically in a manner described hereinbelow.

In step 320, shipping options (e.g., expedited, international, etc.) are specified, either based on pre-set rules relating to the item attributes or by manual specification of shipping options by the worker for the seller.

In step 325, a count is kept for the number of items entered by the worker during a time period (e.g., a day).

In step 330, the worker can correct, modify, or delete any item entries that are incorrect or unacceptable.

In step 335, the warehouse location attribute for the item may be set to indicate a warehouse location where the item is stored or available, if desired In one embodiment, inventory information or data may alternatively be imported from an external inventory data source and can be integrated with most standard Point of Sale (POS) software systems.

Referring to FIG. 2, inventory management suite 110 further includes an inventory upload tool 210 that allows seller 160 to automatically upload inventory to the website or website for one or more online marketplaces 170, either manually based upon a worker command or automatically based on a designated schedule. With the scheduled upload of inventory information, files of Adds, Modifies, and Deletes may be uploaded several times per 24-hour period, including updates of pricing if prices are changed as described below.

Inventory upload tool 210 also supports a complete Purge and Replace operation that deletes all product files with an online marketplace 170 and replaces them with current files from inventory database 190. Such a Purge and Replace operation may be performed periodically (e.g., once per month) to maintain synchronicity between the online marketplace 170 and the inventory database 190.

Inventory upload tool 210 may manage the inventory upload process automatically for selected online marketplaces (e.g., Amazon.com and Half.com), without any manual editing of inventory files and without the need to access the seller account on the marketplace site. Alternatively, sellers may also create and edit a standard inventory export file and manually upload this file to the marketplace site.

An inventory decrement tool 220 automatically decrements inventory quantity from the inventory database when an order is imported into the system from an online marketplace 170. Inventory decrement tool 220 also allows sellers 160 to manually decrement inventory, locating inventory items in the local database by UPC/ISBN/ASIN or by Format/Keyword search. Inventory quantities may be decremented manually by any quantity of one or greater, and a reason for the decrement may also be entered as a note (e.g., Sold, Not Found, Bad Match, etc.).

An inventory notes and shipping tool 230 allows the seller 160 to manage item notes and shipping options. For example, seller 160 can create pre-set item notes based upon the item format, such as "All CDs Like New in Sealed Case" for the CD format, "Books ship within 24 hours" for the book format, and "Electronics ship with tracking number within 24 hours" for the electronics format. Seller 160 can also change and overwrite all existing item notes in inventory database 190 or change all existing notes according to specified format, category, or other attribute.

Likewise, seller 160 can create pre-set shipping options according to format or other attribute. With regard to format, for example, VHS format could have the shipping option "domestic shipping only," CD format could have the shipping option "expedited shipping available," and DVD format could have the shipping option "international shipping available."

A remove inventory items tool 240 allows seller 160 to set quantities to zero for all inventory items having specified format or category attributes, or with other attributes as well. Also, all zero-quantity line items may be removed from inventory database 190 automatically at scheduled intervals, if desired.

An import external inventory data tool 250 allows sellers to import inventory data from an external data source, and with minor customization can be easily integrated with most standard Point of Sale (POS) software systems. This allows seller 160 to manage a retail sales floor while simultaneously offering the same items for sale in one or more online marketplaces 170. By importing add or delete data files from a sales floor POS on a regular schedule (e.g., as often as every 15 minutes) seller 160 can ensure that in-store and virtual inventories are both accurate, and thereby avoid "not found" stock outages.

Pricing management tool 120 allows marketplace seller 160 to automatically price inventory according to the real-time prices in the one or more online marketplaces 170. By choosing from among pre-selected pricing formulas the seller 160 can automatically maximize sales potential by pricing items as competitively as possible, while preserving profit margins by ensuring that the highest competitive price is assigned to each inventory item.

Pricing management tool 120 provides automatic pricing that automatically assigns prices at the point of inventory receiving controlled by inventory receiving tool 200 (FIG. 2). In addition, seller 160 may also choose to have pricing management tool 120 provides automatic re-pricing of all or part of inventory database 190 at scheduled intervals, with pre-selected price formulas. In one implementation, automatic inventory re-pricing runs at a rate of up to about 6000 inventory items per hour.

Initial pricing for newly received items may apply prices based upon the selected item attributes such as format (e.g., CDs, DVDs, VHS, Books, Computer & Video Games, etc.) or seller-created categories (e.g., Drama, Comedy, December 2003 Inventory, Bargain CDs, Cutout CDs, etc.) or any other single or combination of attributes of the items, such as Condition (e.g., New, Like New, Very Good, Good, Acceptable, Refurbished), Inventory Age; Item Receive Date (e.g., Items received between Nov. 15, 2003 and Dec. 31, 2003), Market Sales Rank, Collectible, Weight.

Different price formulas may be assigned when all of the inventory is re-priced based. For example, such re-pricing may be based upon the selected item attributes such as format (e.g., CDs, DVDs, VHS, Books, Computer & Video Games, etc.), seller-created categories (e.g., Drama, Comedy, December 2003 Inventory, Bargain CDs, Cutout CDs, etc.), item receive date (e.g., items received between Nov. 15, 2003 and Dec. 31, 2003), or any combination of these or any other attributes, such as Condition (e.g., New, Like New, Very Good, Good, Acceptable, Refurbished), Inventory Age; Item Receive Date (e.g., Items received between Nov. 15, 2003 and Dec. 31, 2003), Market Sales Rank, Collectible, Weight.

As alternatives to the item attributes, pricing and re-pricing may be based upon real-time competitive prices of like, or identical items on one or more selected online marketplaces 170 (e.g., amazon.com marketplace) and a formulaic calculation applied to those competitive prices. Examples of formulas that can be applied to the competitive real-time pricing include, but are not limited to:

Absolute lowest price—Matches lowest Marketplace price regardless of Class (Used, New, etc.) or condition (Like New, Acceptable, etc.) for the item, excluding the seller's own listing or listings;

Average price of first five items within Class—Creates price based on the average sales price of first five Marketplace items within Class (Used, New, etc.) for the item, excluding the seller's own listing or listings. The Average of first five allows the seller's item to appear on the first page of results listed for the item, thereby maximizing visibility while maintaining the lowest price on that first page of results;

Average price of first three items within Class—Creates price based on the average sales price of first three Marketplace items within Class (Used, New, etc.). The Average of first three allows the seller's item to appear on the first page of results listed for the item, thereby maximizing visibility while maintaining the lowest price on that first page of results;

Average price within Class & Condition—Creates price based on the average sales price of all Marketplace items within Class (Used, New, etc.) and Condition (Like New, Acceptable, etc.) for the item, excluding the seller's own listing or listings;

Lowest price within Class—Creates price based on the lowest completed sale price of Marketplace items within Class (Used, New, etc.) for the item, excluding the seller's own listing or listings;

Lowest price within Class & Condition—Creates price based on the lowest completed sales price of Marketplace items within Class (Used, New, etc.) and Condition (Like New, Acceptable, etc.), excluding the seller's own listing or listings.

Pricing management tool 120 also allows marketplace seller 160 to set prices if there are no other like marketplace items being offered by other vendors. There are several pricing parameters in this case that may be applied in this case, either alone or in combination, including:

Pricing can be set as a percentage of the Manufacturer's Suggested Retail Price (MSRP)

If there is no MRSP available for the item and there are no Marketplace items being offered by other vendors, price can be set at a default amount.

Minimum acceptable price may also be set for inventory receiving, such that an item which will be priced at less than the minimum acceptable price may be automatically rejected in the inventory receiving screen.

Minimum acceptable price may also be set for inventory re-pricing. If an item will be priced at less than the minimum acceptable price during the automatic re-pricing, the item will automatically be priced at the minimum acceptable price.

Seller can have price based on amount of competitor feedback ratings received, excluding competitors who do not make the cut-off; disqualifying less experienced sellers from price calculations.

Seller can restrict the price of a used item to a percentage of the lowest new item price, if a new item is available.

Figure 4:
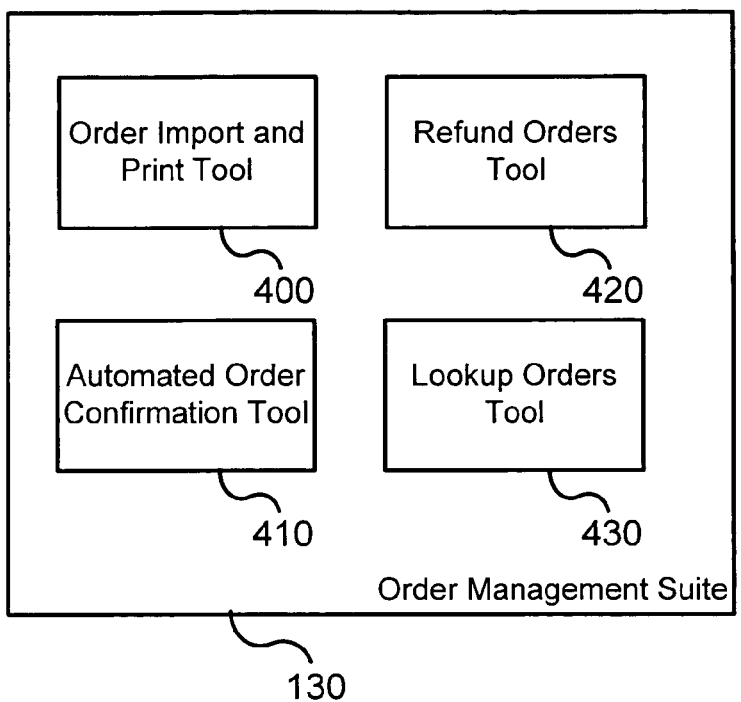
FIG. 4 is a functional block diagram of an order management suite in the online marketplace management system.

Seller can restrict price (in terms of price ceilings) where no competitive listings are available, and also where no market price and no competitive listings are available With reference to the functional block diagram of FIG. 4, order management suite 130 includes a variety of order management tools that automate marketplace order management processes, from downloading new orders through to shipping. Seller 160 can choose picking/packing hierarchies, refund unfulfilled orders, and automatically contact customers via email when the order is shipped. Order management suite 130 can manage partially shipped orders, partial refunds, and can even send emails with delivery tracking numbers when integrated with shipping software.

An order import and print tool 400 allows seller 160 to automatically import all new orders from an online marketplace, such as the Amazon Marketplace or Half.com, at the click of a button. When new orders have all been imported, seller 160 may print all newly imported orders in a pre-selected print order to ensure efficiency in the picking/packing process.

If the seller chooses to print all newly arrived orders, they may choose between the following print orders:

Print all newly imported orders by Shipping Method (Expedited, International, Standard) and then by Locator Code (suited for large warehouse environment)

Print all newly imported orders by Shipping Method and then by SKU order (suited for smaller warehouse environment)

Print all newly imported orders by Shipping Method and then by Format, Category, Artist/Author, Title (suited for retail store environment)

Print all newly imported orders by Shipping Method and then by Format, Title

Print all newly imported orders by Shipping Method and then by Format, Artist/Author, Title Seller 160 may also print a specific number of newly imported orders. These orders will print by date/time received, and will not conform to the printing sort orders listed above. Seller may also re-print any order at any time.

An automated order confirmation tool 410 allows the seller to confirm the fulfillment of each order with a simple scan of a barcode. In one implementation, the confirmation function performs the following functions:

Send "Order Complete" email to customer for orders where all items have been filled.

Send "Partial Shipment" email to customer in cases where items are not available in the database at the time the order is imported ("Sold"), or are not available on the shelf when the order is being picked ("not found"). The "Partial Shipment" email will indicate which items have been shipped and which items were unavailable.

A refund orders tool 420 allows seller 160 to automatically process batch refunds for cancelled or partially shipped orders. Refund orders tool 420 may also send refund notifications to online marketplaces 170 automatically.

A lookup orders tool 430 allows sellers 160 to look up orders in the database by Internal Order Number, Marketplace Order Number or by customer email address, or other order information fields. In one implementation, the order lookup tool allows the seller 160 to reference in an indicated order the information listed in Table 2:

TABLE 2

| Internal Order ID | Order Status (Cancelled, Shipped, etc.) |
|---|---|
| Order Date | Marketplace Order ID |
| Ship Date | Ship Method |
| Shipping Fee | Item Details |

The order lookup tool also displays Customer information, as indicated in Table 3, and allows the seller to edit, update and reprint this information if necessary.

TABLE 3

| Internal Customer ID | Name |
|---|---|
| Address | City |
| Zip | State |
| Country | Email Address |

Sellers may append internal notes to specific orders as well, alerting other users if there is a problem with a particular order, or if there are specific instructions for handling a particular customer's orders. If necessary, the user may change the order status (Cancelled, Shipped, Partial Shipped, etc.) manually using the order lookup tool.

Figure 5:
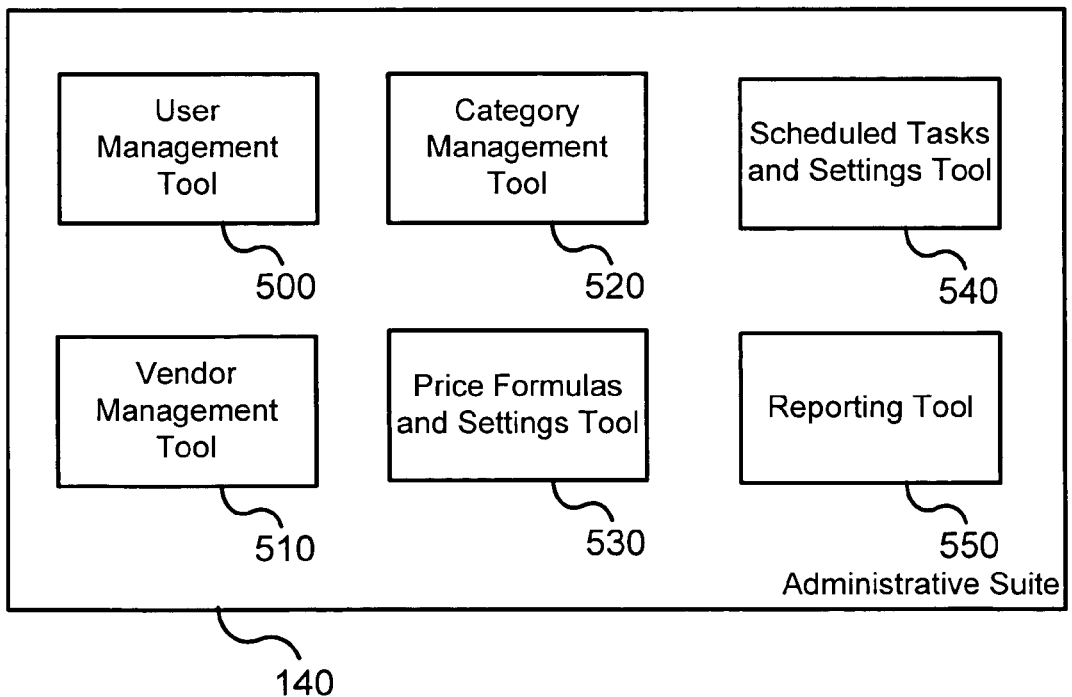
FIG. 5 is a functional block diagram of an administrative suite in the online marketplace management system.

With reference to the functional block diagram of FIG. 5, administrative suite 140 includes a variety of administrative tools functions that can be controlled by designated administrative users, giving differing levels of access to settings and features in online marketplace management system 100.

A user management tool 500 allows an administrator, who has overall access to and rights in system 100, to create and manage users (e.g., workers of seller 160) and their track performance and productivity. IN one implementation, there are two levels of user access, administrative and general, which can be designated in the user management tool 500 for each user. Administrative users will have control over all of the features in online marketplace management system 100, while general users will have access just to inventory receiving and order management functions.

A vendor management tool 510 allows an administrator to create and manage vendors or inventory sources from which inventory is obtained. This allows inventory and sales to be tracked by vendor and the management of multiple inventory sources within one database 180.

A category management tool 520 allows an administrator to create and manage inventory categories. Administrative users can create categories based on criteria that are most relevant to the seller 160. For inventory fulfillment from a retail bookstore sales floor, for example, categories may be designated by genre (Literature A-F, Mystery, Sci-Fi, etc.) As another example, for inventory fulfillment from a warehouse location, categories may be designated by receive date (December 03 Inventory, March 2004 Overstock, etc.). Categories are created and maintained by the user, so the organizational structure can easily be customized to fit specific inventory management needs.

A price formulas and settings tool 530 allows an administrator to specify which price formulas, re-pricing schedules, etc. are to be used. The administrative user controls all price formulas, settings, and functions. A scheduled tasks and settings tool 540 allows an administrative user to designate scheduled tasks, such as automatic uploads of inventory files and automatic re-pricing. An administrative user controls all item notes, shipping parameters, inventory deletes and cleanup, as well as reporting functions.

A reporting tool 550 allows seller 160 to export several data files in standard tab-delimited text format, giving users the ability to build reports based on Inventory, Orders and Customer data. Users may export all inventory data in standard tab-delimited text format. Users may export all orders data in standard tab-delimited text format. Orders data may be exported in entirety or by specific date range or by other search parameters. Users may export all customer data in standard tab-delimited text format. The tab-delimited text format can easily be imported into other database and spreadsheet applications such as Microsoft Excel and Microsoft Access.

Online marketplace management system 100 has been described with reference to an implementation directed to selling of media content such as books, CDs, DVDs, etc. In this context, and with reference to the amazon.com online marketplace 170, the functionality of online marketplace management system 100 may be summarized in part by the following functional outline:

Marketplace Inventory Management
    Data Entry by UPC/ISBN/ASIN (Amazon Stock Identification Number)
    Data Entry by keyword search
    Automated inventory data population including:
        Title
        ISBN
        UPC
        Author
        Media
        Format
        Manufacturer/Publisher/Label
        Publication Date
        List Price
        AMZ Price
        AMZ Sales Rank
        # of Sellers
        Keywords
        Binding Type (Books)
    Data Flags for:
        Seller Condition
        Dust Jacket (Books)
        Jacket Condition (Books)
        Signed Copy (Books)
        First Edition (Books)
        Special Notes
    Single-click entry of multiple item quantities
    Daily Data-entry Item Count by User
    User-configurable inventory location code
    Automated location code assignment and ticket printing
    Ability to create new item listing if data is unavailable
    Single-swipe Data entry with Scanning hardware
    Inventory Identification by
        Vendor
        Format
        Category
        Class
        Condition
Marketplace Order Management
    Automated order download & inventory decrement
    Automated flagging of problem orders (unavailable items)
    Automated cancellation of problem orders
    Single-Click Batch printing of order packing slips
    Automated order shipment confirmation emails
    Integration with shipping & postage systems
Automated Inventory Pricing
    Automated Pricing by category, vendor, format, class, condition & marketplace
    Automated Pricing by formula
    Cost of Goods/Profit index
    Automated price updates by category, vendor, format, class, condition & marketplace
Data Export Tools
    Ability to export inventory, orders and customer data to flat file
    Ability to export inventory by vendor, format, category, class, condition, inventory ID, item status, receive date & modify date
    Ability to export orders by marketplace, order status, order date, ship method & vendor
    Ability to export customer data by marketplace It will be appreciated, however, that online marketplace management system 100 is similarly applicable to the sale of virtually any goods or services that can be sold through an online marketplace and that online marketplace management system 100 as described above is readily adaptable to any such goods. The description of online marketplace management system 100 with reference to the sale of media content is merely for purposes of illustration and is not a limit on the scope of use of system 100.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. On a computer readable medium, online marketplace management software for managing sales by a user on one or more online marketplaces that are operated by entities other than the user, the software comprising:

an inventory management tool for managing inventory that is offered for sale on the one or more online marketplaces, the inventory management tool including a plurality of (a) an inventory receiving tool that allows the user to scan inventory items by product barcodes and maintain inventory records in a database, (b) an inventory upload tool that allows the user to automatically upload inventory to one or more online marketplaces, (c) an inventory decrement tool that automatically decrements inventory quantity from an inventory database when an order is imported from an online marketplace, and (d) an import external inventory data tool that allows the user to import inventory data from a retail Point of Sale system to offer items for sale simultaneously at a retail Point of Sale location and in one or more online marketplaces; and a pricing tool that provides automatic pricing of inventory that is offered for sale on the one or more online marketplaces, the automatic pricing being based upon real-time pricing of like inventory available on at least one online marketplace from one or more third parties other than the user and applying a user-selected automatic pricing formula from among plural ones of:
(a) an absolute lowest price formula that creates a price for an inventory item as a match of a lowest online marketplace price for other like items regardless of quality class or condition of the other like items;
(b) an average price of a first n-number of items within class formula that creates a price for an inventory item based on an average of sales prices of first n-number of like items within a quality class for the inventory item;
(c) an average price within class and condition formula that creates a price for an inventory item based on an average sales price of all online marketplace items within a quality class and condition for the inventory item;
(d) a lowest price within class formula that creates a price for an inventory item based on a lowest completed sale price of like items in an online marketplace within a quality class for the inventory item; and
(e) a lowest price within class and condition formula that creates a price for an inventory item based on lowest completed sales price of in an online marketplace of like items within a quality class and condition; and
an order management tool for managing completion of sales made on an online marketplace.

2. In online marketplace management software on a computer readable medium for managing sales by a user on one or more online marketplaces that are operated by entities other than the user, the improvement comprising:
a pricing tool that provides automatic pricing of an inventory item that is offered for sale on the one or more online marketplaces, the automatic pricing being based upon real-time pricing of like items available on at least one online marketplace from one or more third parties other than the user and applying a user-selected automatic pricing formula from among plural ones of:
(a) an absolute lowest price formula that creates a price for an inventory item as a match of a lowest online marketplace price for other like items regardless of quality class or condition of the other like items;
(b) an average price of a first n-number of items within class formula that creates a price for an inventory item based on an average of sales prices of a first n-number like items within a quality class for the inventory item;
(c) an average price within class and condition formula that creates a price for an inventory item based on an average sales price of all online marketplace items within a quality class and condition for the inventory item;
(d) a lowest price within class formula that creates a price for an inventory item based on a lowest completed sale price of like items in an online marketplace within a quality class for the inventory item; and
(e) a lowest price within class and condition formula that creates a price for an inventory item based on lowest completed sales price of in an online marketplace of like items within a quality class and condition.

3. The online marketplace management software of claim 2 in which the pricing tool applies a user-selected automatic pricing formula from among all of the absolute lowest price formula, the average price of first five items within class formula, the average price within class and condition formula, the lowest price within class formula, and the lowest price within class and condition formula.

4. The online marketplace management software of claim 2 further comprising an inventory management tool for managing inventory that is offered for sale on the one or more online marketplaces, the inventory management tool including a plurality of (a) an inventory receiving tool that allows the user to scan inventory items by product barcodes and maintain inventory records in a database, (b) an inventory upload tool that allows the user to automatically upload inventory to one or more online marketplaces, (c) an inventory decrement tool that automatically decrements inventory quantity from an inventory database when an order is imported from an online marketplace, and (d) an import external inventory data tool that allows the user to import inventory data from a retail Point of Sale system to offer items for sale simultaneously at a retail Point of Sale location and in one or more online marketplaces.

5. The online marketplace management software of claim 1 in which the inventory upload tool allows the user to automatically upload inventory to one or more online marketplaces based on a designated schedule.

6. On a computer readable medium, online marketplace management software for managing sales by a user on one or more online marketplaces that are operated by entities other than the user, the software comprising:
an inventory management tool for managing inventory that is offered for sale on the one or more online marketplaces, the inventory management tool including an inventory receiving tool supports user intake of inventory items and maintenance of inventory records in an inventory database, an inventory upload tool that allows the user to automatically upload inventory to one or more online marketplaces, and an inventory decrement tool that automatically decrements inventory quantity from an inventory database when an order is imported from an online marketplace; and
a pricing tool that provides automatic pricing of an inventory item that is offered for sale on the one or more online marketplaces, the automatic pricing being based upon real-time pricing of like items available on at least one online marketplace from one or more third parties other than the user and applying a user-selected automatic pricing formula from among plural ones of:
(a) an absolute lowest price formula that creates a price for an inventory item as a match of a lowest online marketplace price for other like items regardless of quality class or condition of the other like items;
(b) an average price of a first n-number of items within class formula that creates a price for an inventory item based on an average of sales prices of a first n-number of like items within a quality class for the inventory item;
(c) an average price within class and condition formula that creates a price for an inventory item based on an average sales price of all online marketplace items within a quality class and condition for the inventory item;
(d) a lowest price within class formula that creates a price for an inventory item based on a lowest completed sale price of like items in an online marketplace within a quality class for the inventory item; and
(e) a lowest price within class and condition formula that creates a price for an inventory item based on lowest completed sales price of in an online marketplace of like items within a quality class and condition.

7. The online marketplace management software of claim 6 in which the pricing tool applies a user-selected automatic pricing formula from among all of the absolute lowest price formula, the average price of a first n-number of items within class formula, the average price within class and condition formula, the lowest price within class formula, and the lowest price within class and condition formula.

* * * * *